United States Patent
Destain (10) Patent No.: US 9,386,286 B2
(45) Date of Patent: Jul. 5, 2016

(54) SPARSE SOURCE ARRAY FOR DISPLAY PIXEL ARRAY ILLUMINATION WITH ROTATED FAR FIELD PLANE

(75) Inventor: Patrick Rene Destain, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 669 days.

(21) Appl. No.: 13/152,280

(22) Filed: Jun. 3, 2011

(65) Prior Publication Data
US 2011/0298842 A1    Dec. 8, 2011

Related U.S. Application Data

(60) Provisional application No. 61/352,332, filed on Jun. 7, 2010.

(51) Int. Cl.
| | | |
|---|---|---|
| H04N 9/31 | (2006.01) | |
| G09G 3/00 | (2006.01) | |
| G09G 3/34 | (2006.01) | |

(52) U.S. Cl.
CPC ........... *H04N 9/3152* (2013.01); *H04N 9/3155* (2013.01); *G09G 3/002* (2013.01); *G09G 3/3426* (2013.01); *G09G 2320/0646* (2013.01)

(58) Field of Classification Search
USPC ...................................................... 345/76–84
See application file for complete search history.

(56) References Cited

U.S. PATENT DOCUMENTS

| | | | |
|---|---|---|---|
| 5,650,832 A | | 7/1997 | Poradish et al. |
| 6,813,085 B2 * | | 11/2004 | Richards ....................... 359/630 |
| 7,029,130 B2 | | 4/2006 | Cannon et al. |
| 7,222,968 B2 | | 5/2007 | Magarill et al. |
| 2006/0221019 A1 * | | 10/2006 | Morgan et al. .................. 345/84 |
| 2008/0158263 A1 * | | 7/2008 | Hui et al. ....................... 345/690 |
| 2008/0212173 A1 | | 9/2008 | Mizusawa |
| 2010/0097408 A1 * | | 4/2010 | Michael Marcellinus et al. .............................. 345/690 |

FOREIGN PATENT DOCUMENTS

JP      2008076489       4/2008

\* cited by examiner

*Primary Examiner* — Robin Mishler
(74) *Attorney, Agent, or Firm* — Michael A. Davis, Jr.; Frank D. Cimino (57) ABSTRACT

A pixel array display system including an illumination source of discrete emitters with uniform emitting areas, a separate collimator in front of each emitter, and a condenser in front of said collimators which focuses collimated light from the emitters onto the pixel array. The pixel array display system does not include a light homogenizing optical element such as a light pipe. Each emitter is focused onto at least 75 percent of the pixels. A portion of the emitters which provide collimated light cones proximate to a modulated light optical cone from the pixel array may be provided reduced power in a high contrast operating mode.

20 Claims, 5 Drawing Sheets

SPARSE SOURCE ARRAY FOR DISPLAY PIXEL ARRAY ILLUMINATION WITH ROTATED FAR FIELD PLANE

CROSS-REFERENCE TO RELATED APPLICATIONS

This application claims the benefit of priority under U.S.C. §119(e) of U.S. Provisional Application 61/352,332, filed Jun. 7, 2010.

The following patent application is related: U.S. Patent Application 61/492,815. With its mention in this section, this patent application is not admitted to be prior art with respect to the present invention.

FIELD OF THE INVENTION

This invention relates to the field of pixel array display systems. More particularly, this invention relates to optical systems in pixel array display systems.

BACKGROUND OF THE INVENTION

A pixel array display system may modulate light from an illumination source as a function of input image data for each pixel to produce a display. Providing a desired intensity of illumination with a desired level of spatial uniformity at a desired system cost and complexity may be problematic. For example, a distributed contiguous uniform illumination source with the desired intensity and uniformity may be undesirably costly. Alternatively, using less expensive and less uniform illumination source with a light homogenizing optical element such as a light pipe may also be undesirably costly.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

A pixel array display system may have a spatially distributed multiple emitter discrete illumination source, referred to herein as a sparse source array, in which each emitter has a separate collimator. The display system may further include a condenser which focuses collimated light from each emitter onto a plurality, and preferably all, of pixels in a pixel array of the display system. The display system is free of a light homogenizing optical element, such as a light pipe, between the illumination source and the pixel array. The pixel array modulates light from the condenser and directs the modulated light into a modulated light optical cone. The emitters of the illumination source may be configured so as to increase an etendue of the pixel array display system.

DETAILED DESCRIPTION OF EXAMPLE EMBODIMENTS

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

For the purposes of this description, the term "substantially equal" is understood to mean equal within manufacturing tolerances and/or operating tolerances, and within unintended variations encountered during fabrication and/or operation of embodiments.

A pixel array display system may have a spatially distributed multiple emitter discrete illumination source, referred to herein as a sparse source array, in which each emitter has a separate collimator. The display system may further include a condenser which focuses collimated light from each emitter onto a plurality, and preferably all, of pixels in a pixel array of the display system. The display system is free of a light homogenizing optical element, such as a light pipe, between the illumination source and the pixel array. The pixel array modulates light from the condenser and directs the modulated light into a modulated light optical cone. The emitters of the illumination source may be configured so as to increase an etendue of the pixel array display system.

The display system may optionally include an anamorphic element, between the collimators and the condenser, or after the condenser, to provide a desired aspect ratio of the illumination optical cone. The display system may also optionally include a source diaphragm to define a source area for the illumination optical cone. The emitters of the illumination source may be light emitting diodes (LEDs), and may further have a square or rectangular emitting area. Emitters in the illumination source proximate to the modulated light optical cone may be modulated so as to improve contrast of the display system.

Figure 1:
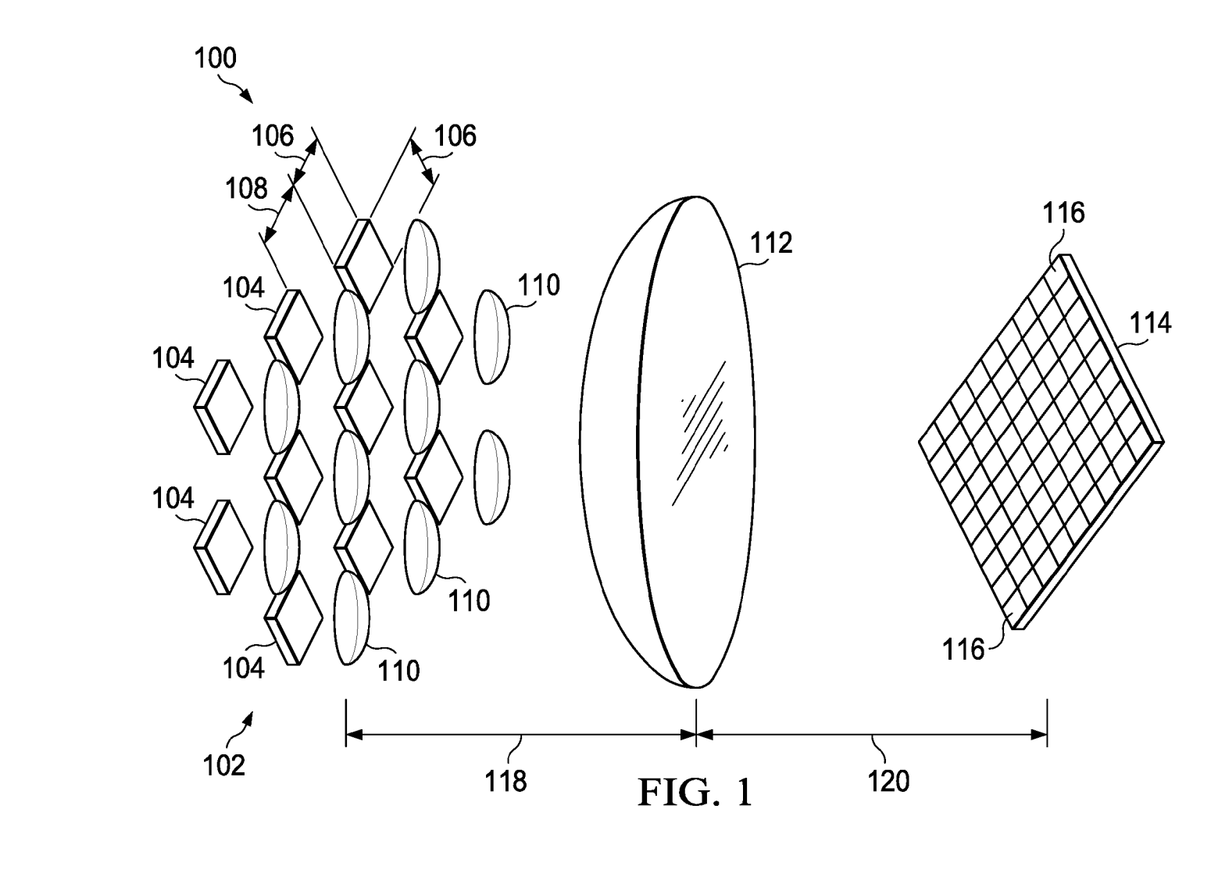
FIG. 1 depicts a pixel array display system formed according to an embodiment.

FIG. 1 depicts a pixel array display system formed according to an embodiment. The display system 100 has an illumination source 102 which includes a plurality of discrete light emitters 104. The emitters 104 have characteristic orthogonal lateral dimensions 106, such as a width and a width for a rectangular-shaped or square emitter 104 or a vertical axis diameter and a horizontal axis diameter for an elliptical-shaped or circular-shaped emitter 104, such that at least 75 percent of a total light emission from each emitter 104 is emitted from an area spanned by the characteristic lateral dimensions 106. The emitters 104 are laterally separated from each other by a distance 108 which is at least five percent of a minimum value of the characteristic lateral dimensions 106. Alternatively, distance 108 is at least ten percent, at least twenty percent, at least thirty percent, at least forty percent, at least fifty percent, or more than fifty percent of a minimum value of the characteristic lateral dimensions 106. In one version of the instant embodiment, the emitters 104 may be square shaped with characteristic lateral dimensions 106 between 0.9 and 1.1 millimeters.

A separate collimator 110 is disposed in front of each emitter 104. During operation of the display system 100, light from each emitter 104 is converted to a parallel optical cone by the respective collimator 110 so that a principal axis of the optical cone is parallel to principal axes of optical cones of the remaining emitters 104. A combination of the parallel optical cones from the emitters 104 provides an illumination optical cone.

The display system 100 further includes a condenser 112 disposed in the optical cones of the collimators 110. Light from the collimators 110 is focused by the condenser 112 onto a pixel array 114. The pixel array 114 modulates light from the condenser 112 and directs the modulated light into a modulated light optical cone.

In one version of the instant embodiment, the collimators 110 may be disposed at a first distance 118 from the condenser 112 which is between 80 percent and 120 percent of a focal length of the condenser 112, and the condenser 112 may be disposed at a second distance 120 from the pixel array 114 which is also between 80 percent and 120 percent of the focal length of the condenser 112.

In another version of the instant embodiment, the collimators 110 may be disposed at the first distance 118 from the condenser 112 which is less than 20 percent of the focal length of the condenser 112, while the condenser 112 may be disposed at the second distance 120 from the pixel array 114 which is also between 80 percent and 120 percent of the focal length of the condenser 112.

The display system 100 is free of a light homogenizing optical element, such as a light pipe, between the illumination source 102 and the pixel array 114. Light from each emitter 104 is focused on at least 75 percent, and preferably all, of the pixels 116 in the pixel array 114, so as to advantageously average out non-uniformities in individual instances of the emitters 104.

In one embodiment, the illumination pattern over an array of pixels 116 has a uniformity of at least ninety-five percent, meaning that the intensity of illumination profile across the array of pixels 116 has local minima that are at least ninety-five percent of adjacent local maxima. In one version of the instant embodiment, the pixels 116 may be micromirror pixels. In another version, the pixels 116 may be Liquid Crystal On Silicon (LCOS) pixels. In an alternate version, the pixels 116 may be Liquid Crystal Display (LCD) pixels with thin film transistors (TFTs.)

The emitters 104 may be configured so as to increase an etendue of the display system 100.

Figure 2:
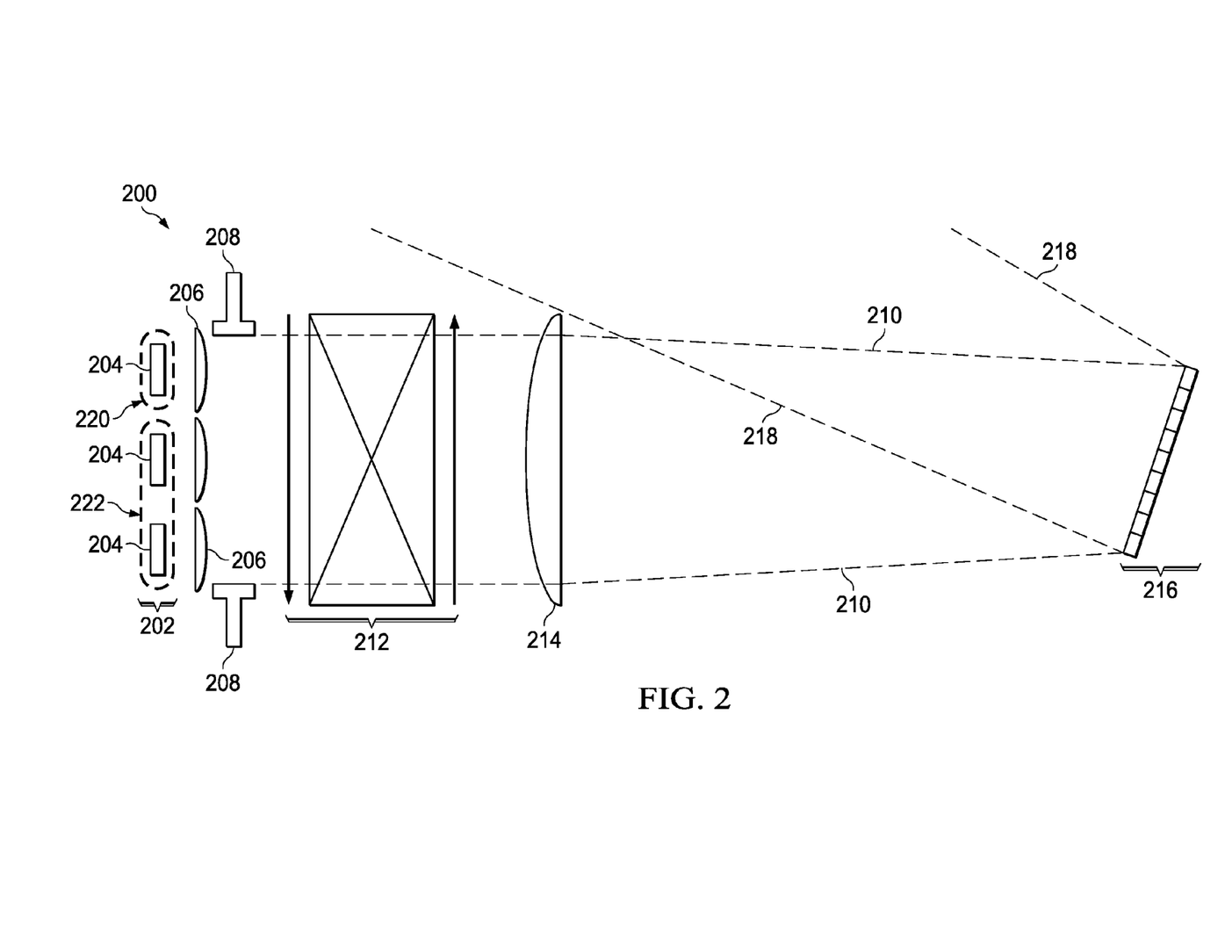
FIG. 2 depicts a pixel array display system formed according to another embodiment.

FIG. 2 depicts a pixel array display system formed according to another embodiment. The display system 200, shown in side view, has an illumination source 202 which includes a plurality of discrete light emitters 204 as described in reference to FIG. 1. A separate collimator 206 is disposed in front of each emitter 204.

An optional source diaphragm 208 may be disposed in front of the collimators 206. The source diaphragm 208 defines boundaries of an illumination optical cone 210 of the display system 200.

A condenser 214 is disposed in front of the collimators 206. The condenser 214 focuses the collimated light in the illumination optical cone 210 onto a pixel array 216. The spatial configuration of the illumination optical cone 210 relative to the pixel array is as described in reference to FIG. 1.

The display system 200 may also include an optional anamorphic optical element 212, such as an anamorphic lens, disposed in front of the collimators 206 as depicted in FIG. 2, or in front of the condenser 214. The anamorphic optical element 212 may, for example, provide different horizontal and vertical magnifications, so as to change an aspect ratio of the illumination optical cone 210 to provide a desired aspect ratio of a displayed image of the display system 200. In other versions of the instant embodiment, relative positions of the source diaphragm 208 and the anamorphic optical element 212 may be exchanged.

During operation of the display system 200, the pixel array 216 modulates the light in the illumination optical cone 210 and directs the modulated light into a modulated light optical cone 218. A high brightness operating mode of the display system 200 may include providing a substantially equal amount of electrical power to each of the emitters 204 in the illumination source 200. An optional high contrast operating mode may include reducing power to a first portion 220 of the emitters 204 whose collimated light cones are proximate to the modulated light optical cone 218, while maintaining a higher level of power to a second portion 222 of remaining emitters 204 so that light from each of the first portion 220 of the emitters 204 is at least 50 percent less than light from each of the second portion 222 of remaining emitters 204. Power to the first portion 220 of the emitters 204 may be adjusted on a frame basis as a function of an average brightness of an image to be displayed in each frame. Operating the display system 200 in the optional high contrast mode may advantageously increase a brightness contrast of the display system 200.

Figure 3:
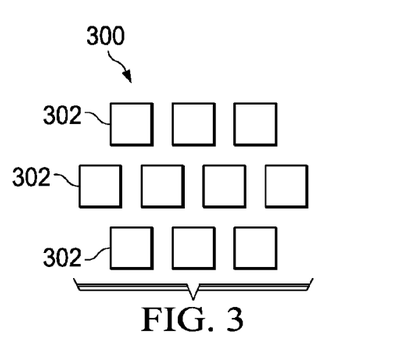
FIG. 3 through FIG. 7 depict sparse arrays of emitters for pixel array display system formed according to embodiments.
Figure 4:
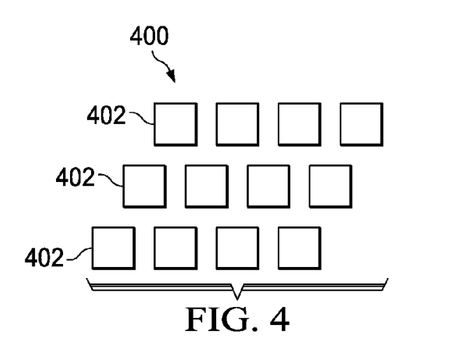
Figure 5:
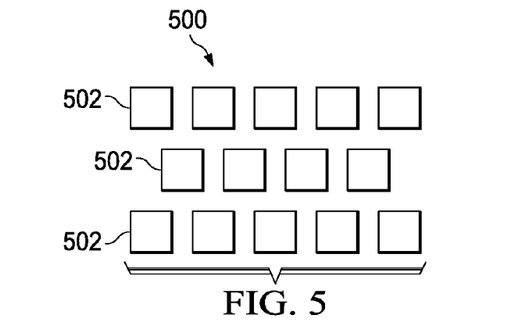
Figure 6:
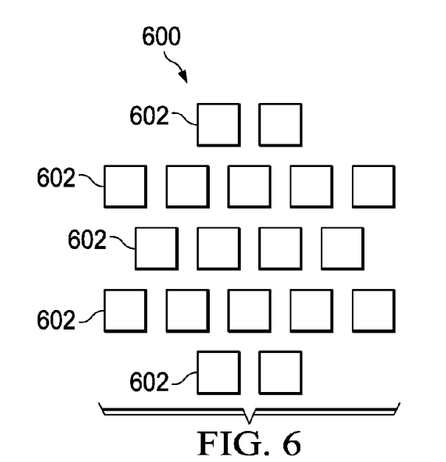
Figure 7:
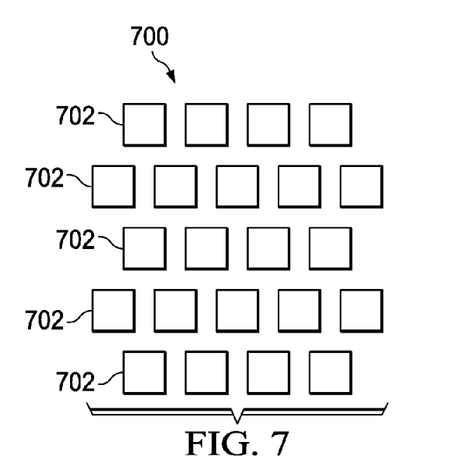

FIG. 3 through FIG. 7 depict sparse arrays of emitters for pixel array display system formed according to embodiments. Referring to FIG. 3, an illumination source 300 includes a sparse array of ten emitters 302 configured in three rows, which may have a width:height aspect ratio appropriate for low aspect ratio displays. Referring to FIG. 4, an illumination source 400 includes a sparse array of 12 emitters 402 configured in three rows of four emitters 402 in each row. Referring to FIG. 5, an illumination source 500 includes a sparse array of 14 emitters 502 configured in three rows, which may have a width:height aspect ratio appropriate for high aspect ratio displays, such as television or movie displays. Referring to FIG. 6, an illumination source 600 includes a sparse array of 18 emitters 602 configured in five rows, which may provide a high illumination level appropriate for display systems with substantially circular illumination cones and requiring high brightness, such as outdoor displays. Referring to FIG. 7, an illumination source 700 includes a sparse array of 22 emitters 702 configured in five rows, which may provide a high illumination level appropriate for low aspect ratio displays, such as such as outdoor displays.

Figure 8:
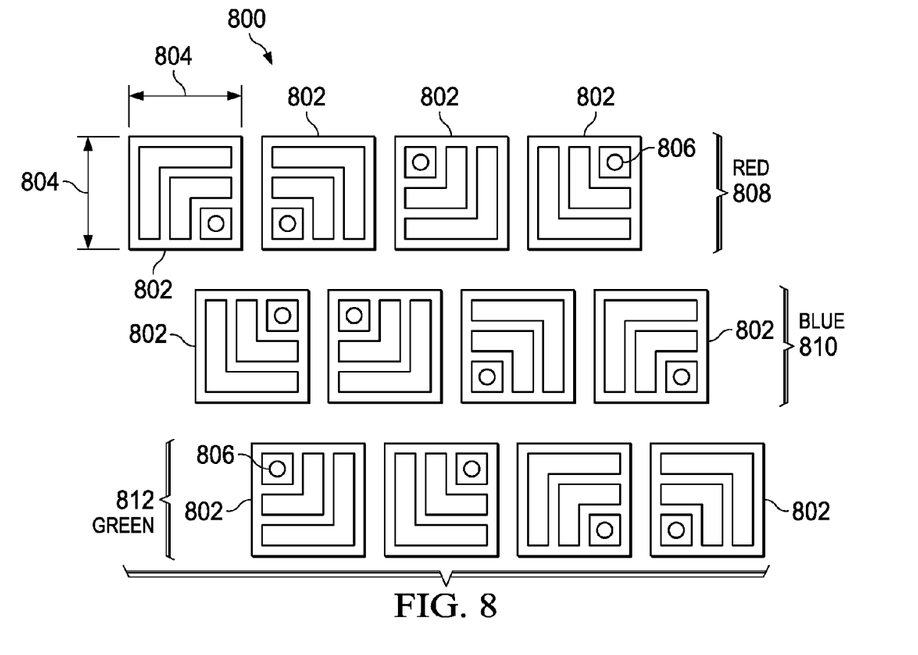
FIG. 8 depicts a sparse array of emitters formed according to an embodiment.

FIG. 8 depicts a sparse array of emitters formed according to an embodiment. The sparse array 800 includes at least four emitters 802. The emitters 802 have characteristic orthogonal lateral dimensions 804, such that at least 75 percent of a total light emission from each emitter 802 is emitted from an area spanned by the characteristic lateral dimensions 804. Light emission from each emitter 802 may not be completely uniform over the area spanned by the characteristic lateral dimensions 804. For example, the emitters 802 may have features which reduce or block light emission, as indicated in FIG. 8 by opaque metal leads 806 and ball bond pads 808 in the area spanned by the characteristic lateral dimensions 804. In the instant embodiment, instances of the emitters 802 are rotated in increments of 90 degrees with respect to each other. Other embodiments include rotations of less than or more than 90 degrees. Configuring the emitters 802 so that instances of the emitters 802 are rotated with respect to each other may improve a uniformity of illumination at a pixel array of a display system containing the sparse array 800.

In a version of the instant embodiment, instances of the emitters 802 may emit light of different colors so as to provide illumination for a color display. For example, a first row 808 may contain instances of the emitters which emit red light, a second row 810 may contain instances of the emitters which emit blue light, and a third row 812 may contain instances of the emitters which emit green light, as depicted in FIG. 8. Within instances of the emitters 802 which emit light of a same color, orientations of the emitters 802 may be rotated with respect to each other, as depicted in FIG. 8.

Figure 9:
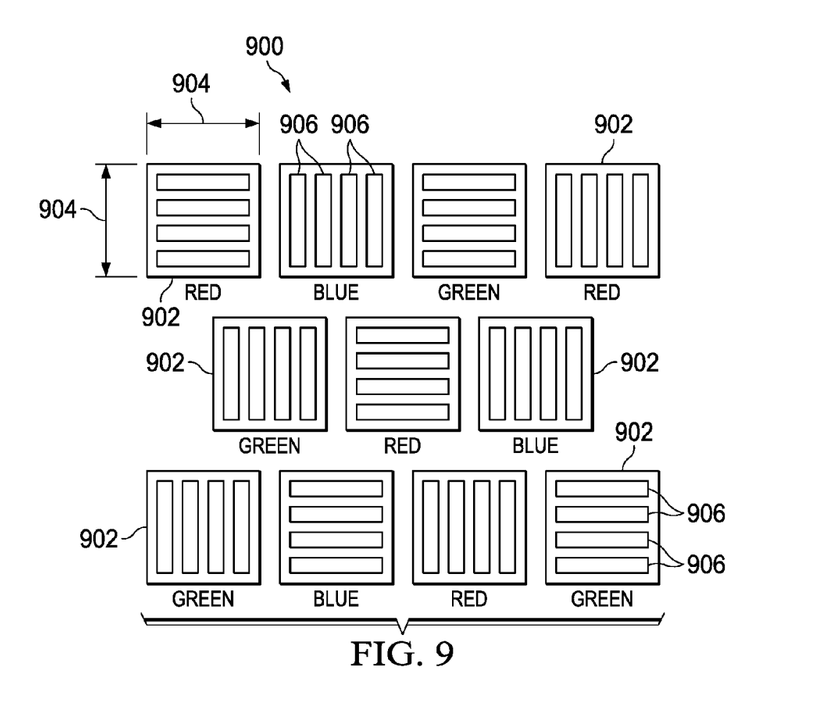
FIG. 9 depicts a sparse array of emitters formed according to an embodiment.

FIG. 9 depicts a sparse array of emitters formed according to another embodiment. The sparse array 900 includes at least four emitters 902. The emitters 902 have characteristic orthogonal lateral dimensions 904, such that at least 75 percent of a total light emission from each emitter 902 is emitted from an area spanned by the characteristic lateral dimensions 904. Light emission from each emitter 902 may be restricted to lateral bars 906 in the area spanned by the characteristic lateral dimensions 904. In the instant embodiment, instances of the emitters 902 are rotated 90 degrees with respect to each other so as to improve a uniformity of illumination at a pixel array of a display system containing the sparse array 900. As described in reference to FIG. 8, instances of the emitters 902 may emit light of different colors so as to provide illumination for a color display. In the instant embodiment, instances of the emitters 902 which emit light of a same color may be spatially distributed, as depicted in FIG. 9.

One embodiment of the present invention enables illumination systems to provide a beam of light having satisfactory uniformity across the beam of light without the need for an homogenizing device such as an integrating rod or tunnel. Avoiding the use of a homogenizing optical element such as a light pipe enables the use of illumination optics having an asymmetric f-number which allows a display system to increase the brightness of the image without degrading the contrast of the image.

Display systems based on micromirror devices utilize an array of micromirrors which rotate about an axis in either direction about a neutral position parallel to the array of micromirrors. Assuming the micromirror tilts N degrees in either direction, the illumination system typically is designed to illuminate the array from an angle of 2N degrees relative to the optical normal for the array—which is perpendicular to the array of mirrors and perpendicular to a given mirror in the neutral or undeflected position. When the mirror is rotated N degrees toward the illumination beam the light reflected by the rotated micromirror leaves the array along the array normal. This light enters the aperture of the projection optics and is focused to form a illuminated image pixel on the image plane. When the mirror is rotated N degrees away from the illumination beam the light reflected by the rotated micromirror leaves the array along a path 4N degrees away from the optical normal. This light does not enter the aperture of the projection optics and the image pixel corresponding to the micromirror is dark on the image plane.

Figure 10:
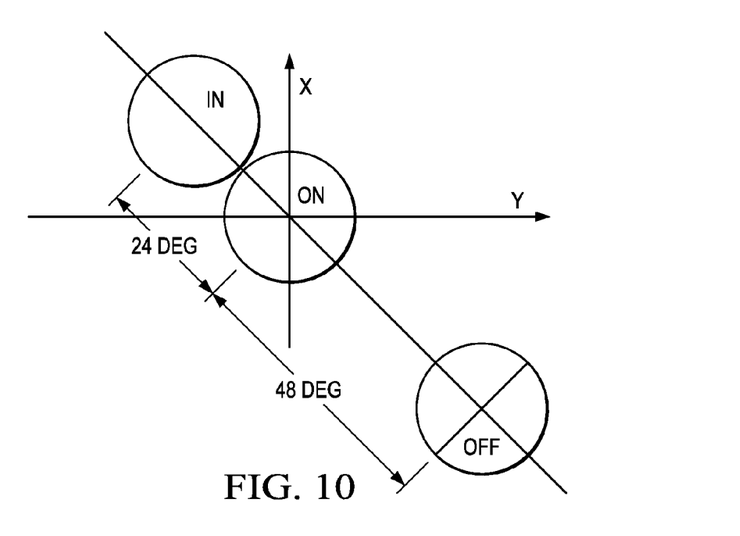
FIG. 10 is a schematic illustration of the illumination, projection, and unused cones of light in a projection display system.

FIG. 10 depicts a cone of illumination light illustrated as a circle labeled "In," a cone of projection light illustrated as a circle labeled "On," and a cone of unused light illustrated as a circle labeled "Off." The illumination and projection optics are designed to have a predetermined cone shape, commonly called an f-number. Generally, the lower the f-number the wider the cone of light and the brighter the ensuing image produced by the display system.

The brightness and contrast of a projection display system using an orthogonal array of pixels with an axis of rotation aligned at an angle of 45 degrees relative to the length and width of the array is limited by the far field pattern separation capability. As shown in FIG. 10, a limit is reached when the illumination cone "In" and the projection cone "On" begin to intersect. At this point the illumination cone and the projection cone interfere and cannot be effectively separated.

Figure 11:
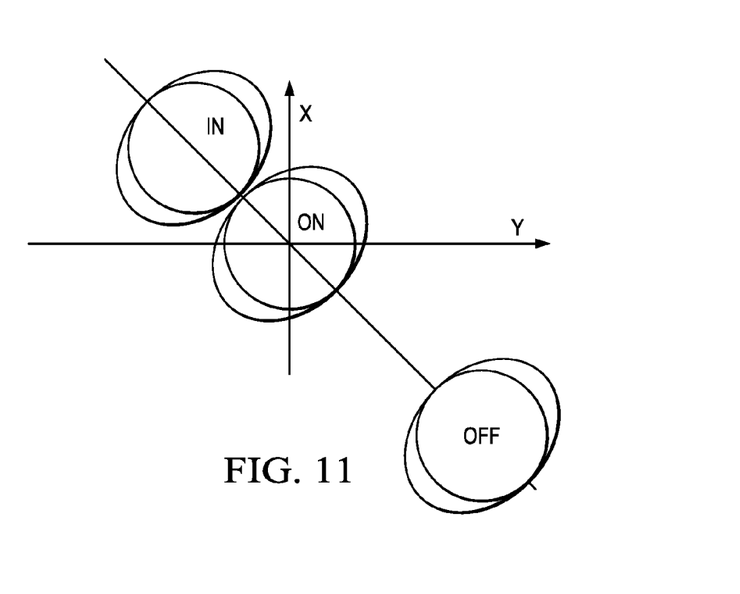
FIG. 11 is a schematic illustration of the illumination, projection, and unused cones of light in a projection display system illustrating asymmetric light cones.

The illumination system of the present invention allows the use of rotated asymmetric cones illustrated in FIG. 11 as superimposed over the circles formed by symmetrical illumination and projection cones. Asymmetric cones may be formed by proper shaping of the array of light emitting elements. For example, the array shown in FIG. 4 will produce at the far field, an asymmetric illumination cone, with a longer dimension along the direction extending between the lower left and the upper right emitters 402. When a homogenizing optical device, such as a light pipe, is not used the asymmetric illumination cone may be rotated relative to the axis of rotation of the micromirror array without rotating the near field pattern—allowing the use of efficient optics while efficiently illuminating the micromirror pixel array without excessive overfill.

The present illumination system may optionally be used to further increase the contrast ratio of an image when the image does not have to be at a maximum brightness. This effect is similar to the use of an asymmetric mechanical aperture which blocks the portion of the illumination beam, illustrated as "In" in FIG. 10, positioned closest to the projection beam illustrated as "On" in FIG. 10. When multiple emitters are used to create the illumination beam, the emitters may be independently enabled. When a maximum brightness level is not desired, one or more of the emitters located in a portion of the illumination cone nearest the projection cone can be disabled to further shape the far field illumination pattern and improve the image contrast ratio.

While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. An image display system, comprising:
   an illumination source including a plurality of discrete LED light emitters to produce light for an image of the image display system, said emitters having characteristic orthogonal lateral dimensions such that at least 75 percent of a total light emission from each of said emitters is emitted from an area spanned by said characteristic lateral dimensions, said emitters being laterally separated from each other by a distance which is at least five percent of a minimum value of said characteristic lateral dimensions;

a plurality of collimators, such that a separate collimator is disposed in front of each of said emitters, so that light from each of said emitters is converted to an optical cone by each respective said collimator, so that principal axes of said optical cones are parallel to one another, and so that a combination of said optical cones provides an illumination optical cone;

a condenser disposed in said optical cones of said collimators; and a micromirror array including a plurality of micromirrors, without a light homogenizing optical element between said illumination source and said micromirror array, disposed so that said condenser focuses said optical cones of said collimators onto said micromirror array so that each of said emitters is imaged onto at least 75 percent of said micromirrors; such that said micromirror array is substantially uniformly illuminated by said illumination source without said a light homogenizing optical element, and said micromirror array modulates light in said illumination optical cone and directs said modulated light into a modulated light optical cone for display of said image.

2. The display system of claim 1, further including a source diaphragm disposed in front of said plurality of said collimators.

3. The display system of claim 1, further including an anamorphic optical element disposed in front of said plurality of said collimators, said anamorphic optical element providing different horizontal and vertical magnifications.

4. The display system of claim 1, in which at least one instance of said emitters is operational to emit red light, at least one instance of said emitters is operational to emit blue light, and at least one instance of said emitters is operational to emit green light.

5. The display system of claim 1, in which said emitters are square-shaped light emitting diodes (LEDs); and said characteristic lateral dimensions are between 0.9 and 1.1 millimeters.

6. The display system of claim 5, in which said plurality of said emitters is composed of ten said emitters, said ten emitters being configured in three rows.

7. The display system of claim 5, in which said plurality of said emitters is composed of 12 said emitters, said 12 emitters being configured in three rows of four said emitters in each said row.

8. The display system of claim 5, in which said plurality of said emitters is composed of 14 said emitters, said 14 emitters being configured in three rows.

9. The display system of claim 5, in which said plurality of said emitters is composed of 18 said emitters, said 18 emitters being configured in five rows.

10. The display system of claim 5, in which said plurality of said emitters is composed of 22 said emitters, said 22 emitters being configured in five rows.

11. A process of operating an image display system, the process comprising:

operating said display system in a high brightness mode, by providing a substantially equal amount of electrical power to each of a plurality of LED emitters contained in an illumination source for providing light for display of an image of said display system; and operating said display system in a high contrast mode, including:

providing a reduced level of electrical power to a first portion of said plurality of said emitters, in which said emitters in said first portion are disposed in said illumination source so that collimated light cones from said emitters in said first portion are proximate to a modulated light optical cone from a micromirror array of said display system; and providing an unreduced level of electrical power to a second portion of remaining emitters in said illumination source, said reduced level of electrical power being at least 50 percent less than said unreduced level;

wherein:

said emitters of said illumination source have characteristic orthogonal lateral dimensions such that at least 75 percent of a total light emission from each of said emitters is emitted from an area spanned by said characteristic lateral dimensions;

said emitters are laterally separated from each other by a distance which is at least five percent of a minimum value of said characteristic lateral dimensions;

a plurality of collimators are disposed in said display system, such that a separate collimator is disposed in front of each of said emitters, so that light from each of said emitters is converted to an optical cone by each respective said collimator, so that principal axes of said optical cones are to one another;

a combination of said optical cones provides an illumination optical cone;

a condenser is disposed in said optical cones of said collimators, without a light homogenizing optical element between said illumination source and said micromirror array, so that said condenser focuses said optical cones of said collimators onto said micromirror array;

each of said emitters is imaged onto at least 75 percent of said micromirror array such that said micromirror array is substantially uniformly illuminated by said illumination source without said light homogenizing optical element; and said micromirror array modulates light in said illumination optical cone and directs said modulated light into a modulated light optical cone for display of said image.

12. The process of claim 11, in which said display system further includes a source diaphragm disposed in front of said plurality of said collimators.

13. The process of claim 11, in which said display system further includes an anamorphic optical element disposed in front of said plurality of said collimators, said anamorphic optical element providing different horizontal and vertical magnifications.

14. The process of claim 11, in which at least one instance of said emitters emits red light, at least one instance of said emitters emits blue light, and at least one instance of said emitters emits green light.

15. The process of claim 11, in which said emitters are square-shaped light emitting diodes (LEDs); and said characteristic lateral dimensions are between 0.9 and 1.1 millimeters.

16. The process of claim 15, in which said plurality of said emitters is composed of ten said emitters, said ten emitters being configured in three rows.

17. The process of claim 15, in which said plurality of said emitters is composed of 12 said emitters, said 12 emitters being configured in three rows of four said emitters in each said row.

18. The process of claim 15, in which said plurality of said emitters is composed of 14 said emitters, said 14 emitters being configured in three rows.

19. The process of claim 15, in which said plurality of said emitters is composed of 18 said emitters, said 18 emitters being configured in five rows.

20. The process of claim 15, in which said plurality of said emitters is composed of 22 said emitters, said 22 emitters being configured in five rows.

* * * * *